No. 609,387. Patented Aug. 16, 1898.
G. P. FISHER, Jr. & J. REIF, Jr.
MACHINE FOR MAKING SLAT AND WIRE FABRIC.
(Application filed Apr. 25, 1898.)
(No Model.) 14 Sheets—Sheet I.
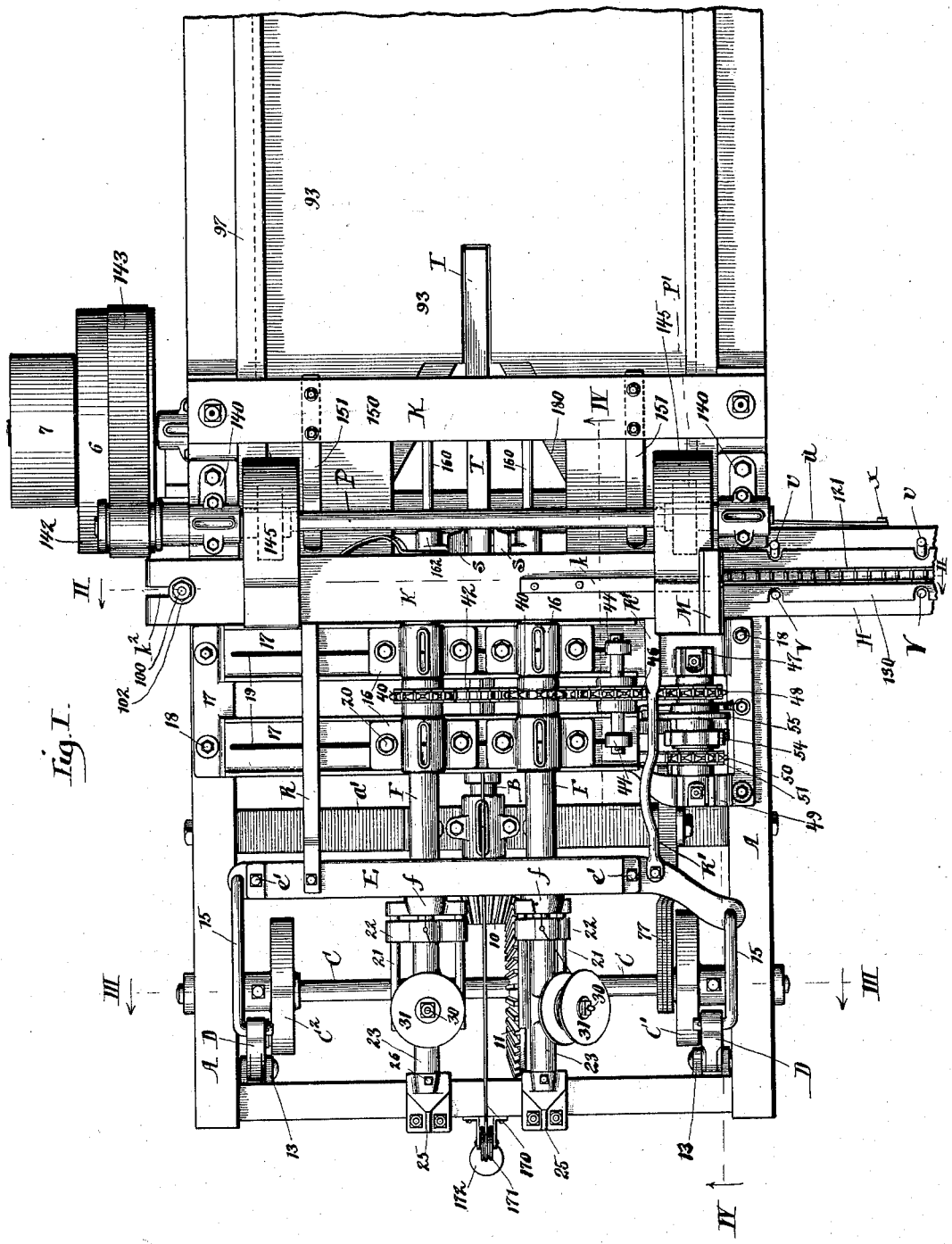

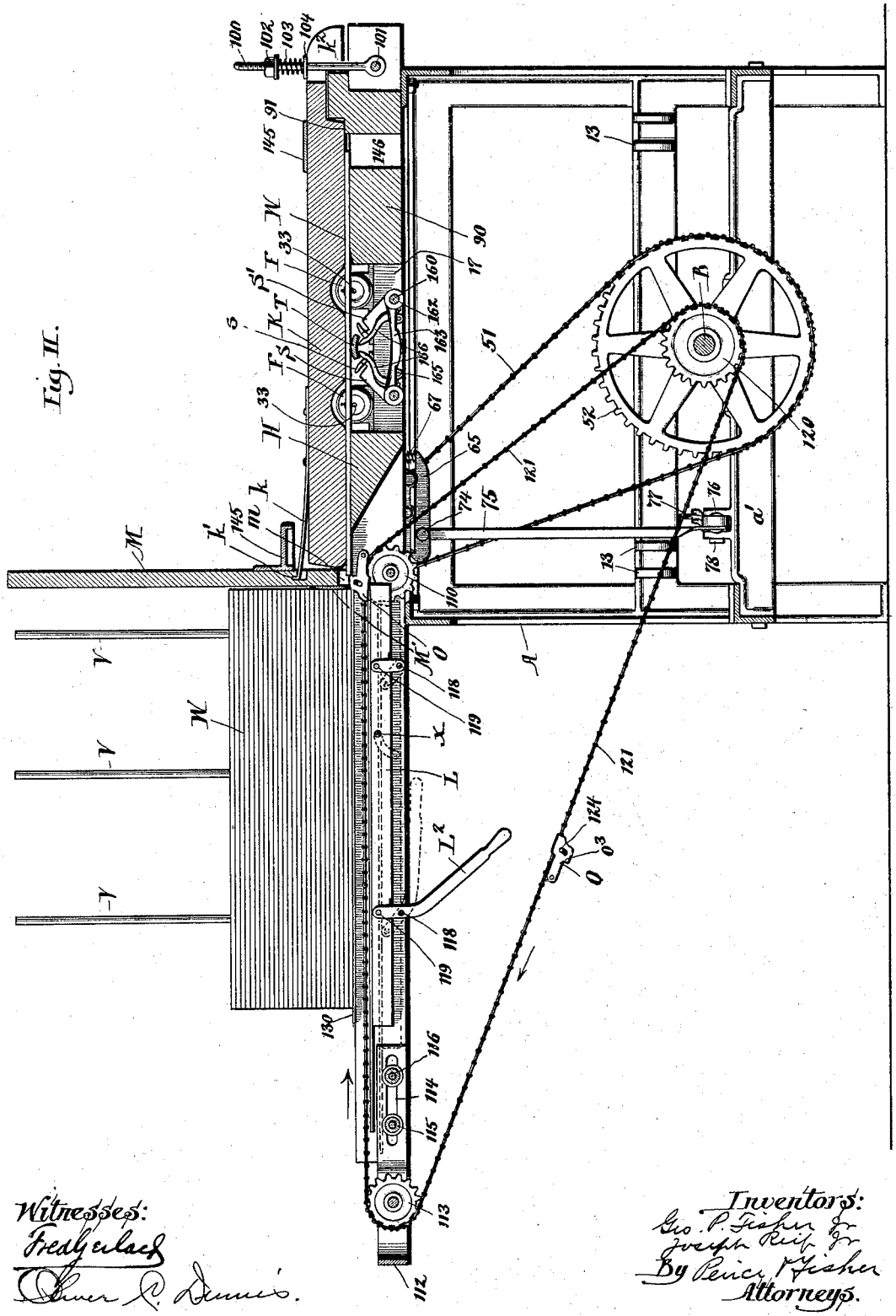

No. 609,387. Patented Aug. 16, 1898.
G. P. FISHER, Jr. & J. REIF, Jr.
MACHINE FOR MAKING SLAT AND WIRE FABRIC.
(Application filed Apr. 25, 1898.)
(No Model.) 14 Sheets—Sheet 3.
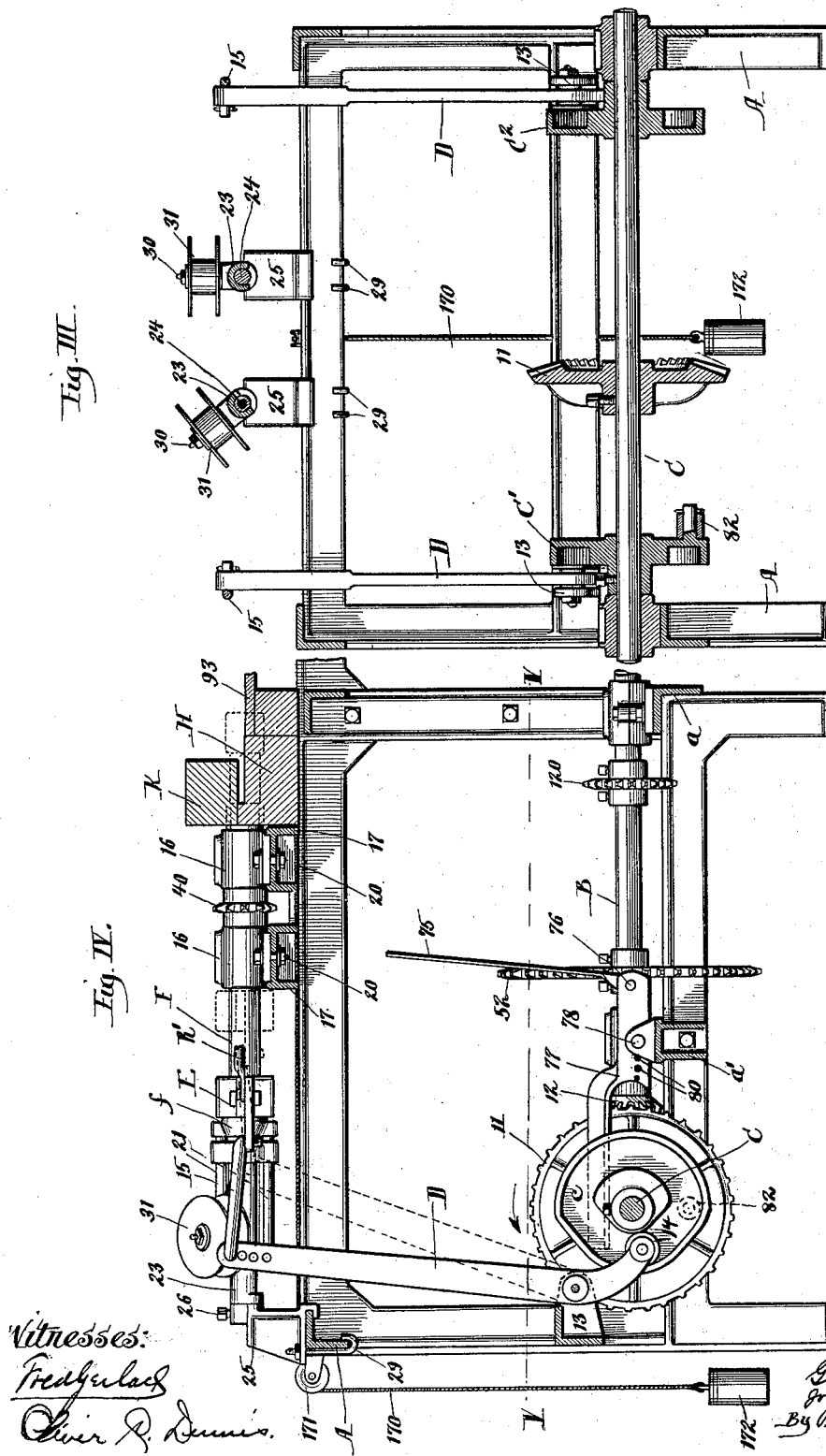

No. 609,387. Patented Aug. 16, 1898.
G. P. FISHER, Jr. & J. REIF, Jr.
MACHINE FOR MAKING SLAT AND WIRE FABRIC.
(Application filed Apr. 25, 1898.)
(No Model.) 14 Sheets—Sheet 4.
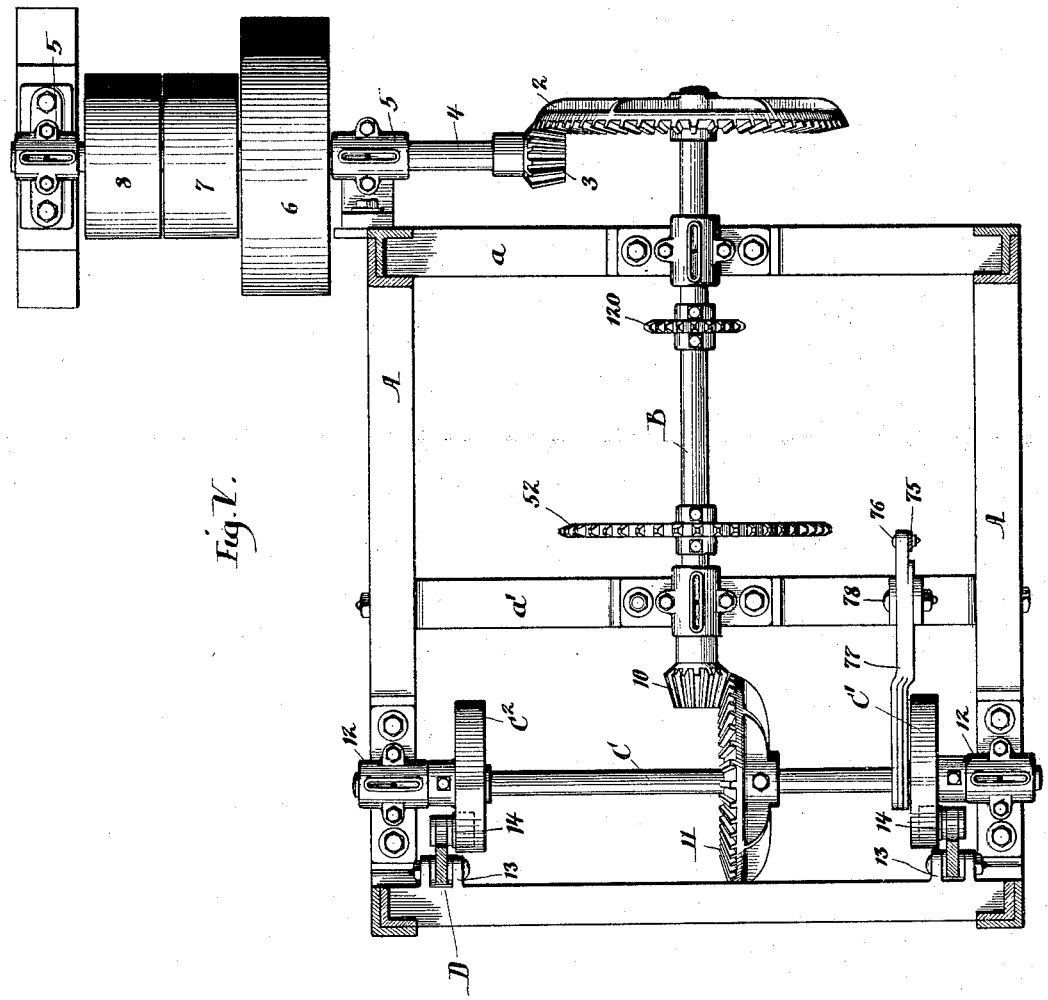
Witnesses:
Inventors:

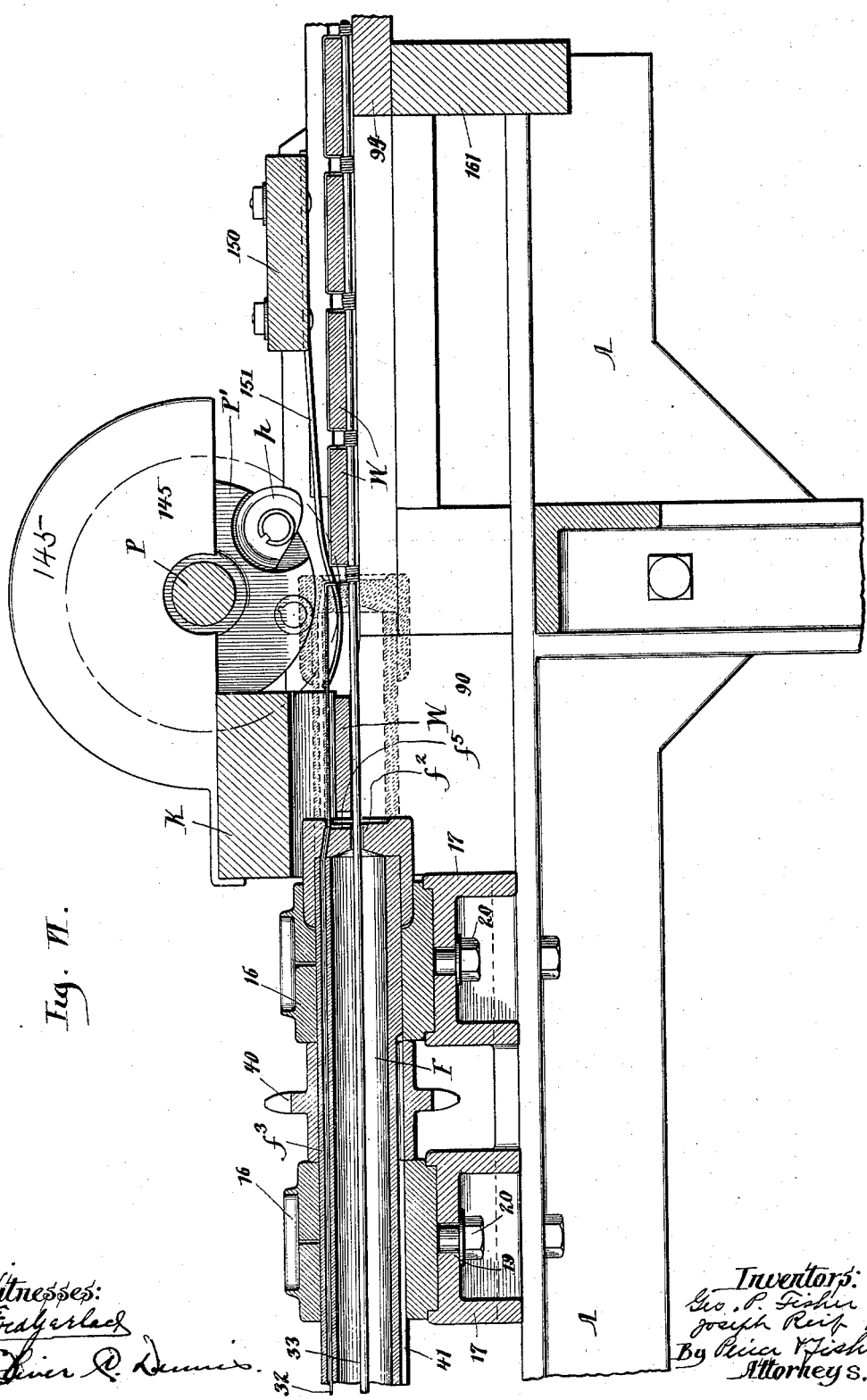

No. 609,387. Patented Aug. 16, 1898.
G. P. FISHER, Jr. & J. REIF, Jr.
MACHINE FOR MAKING SLAT AND WIRE FABRIC.
(Application filed Apr. 25, 1898.)
(No Model.) 14 Sheets—Sheet 6.
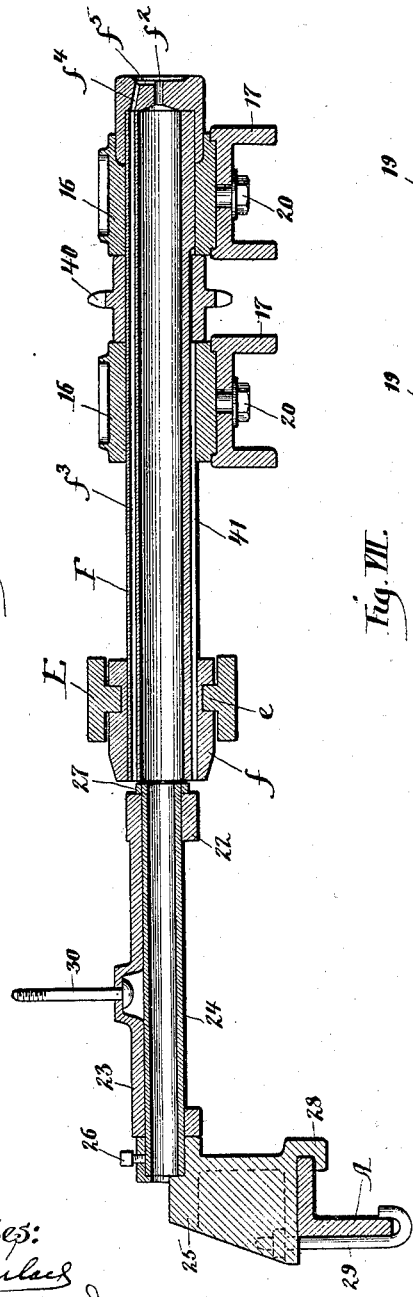
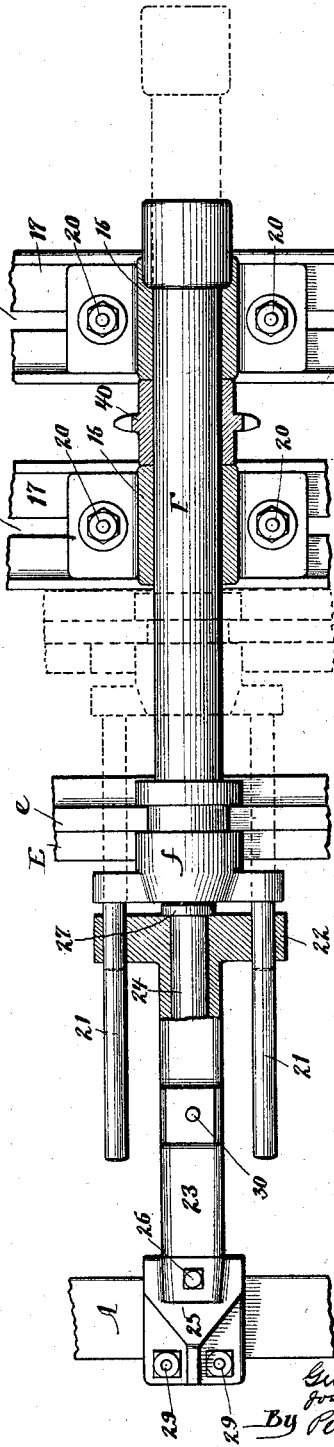

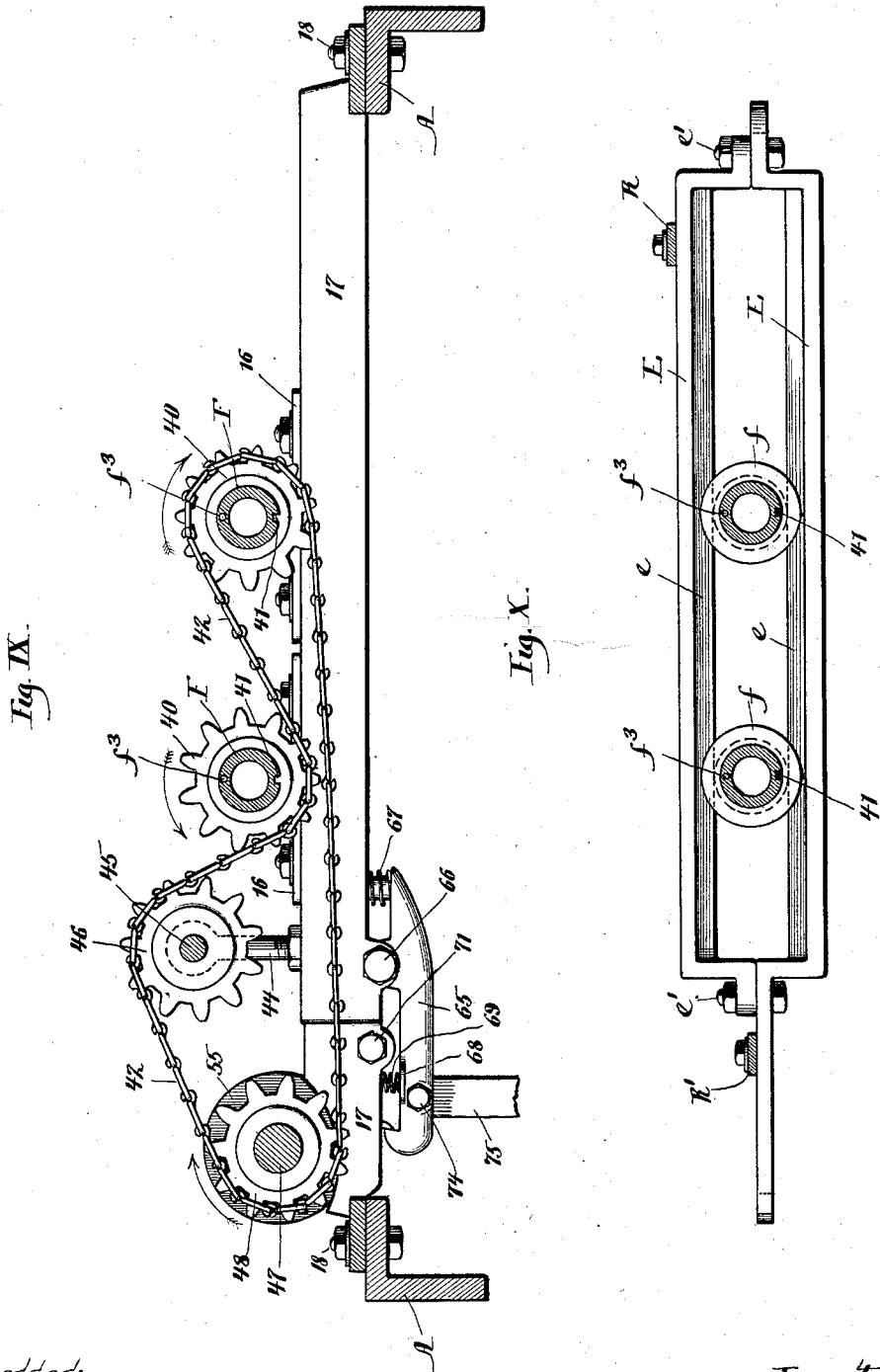

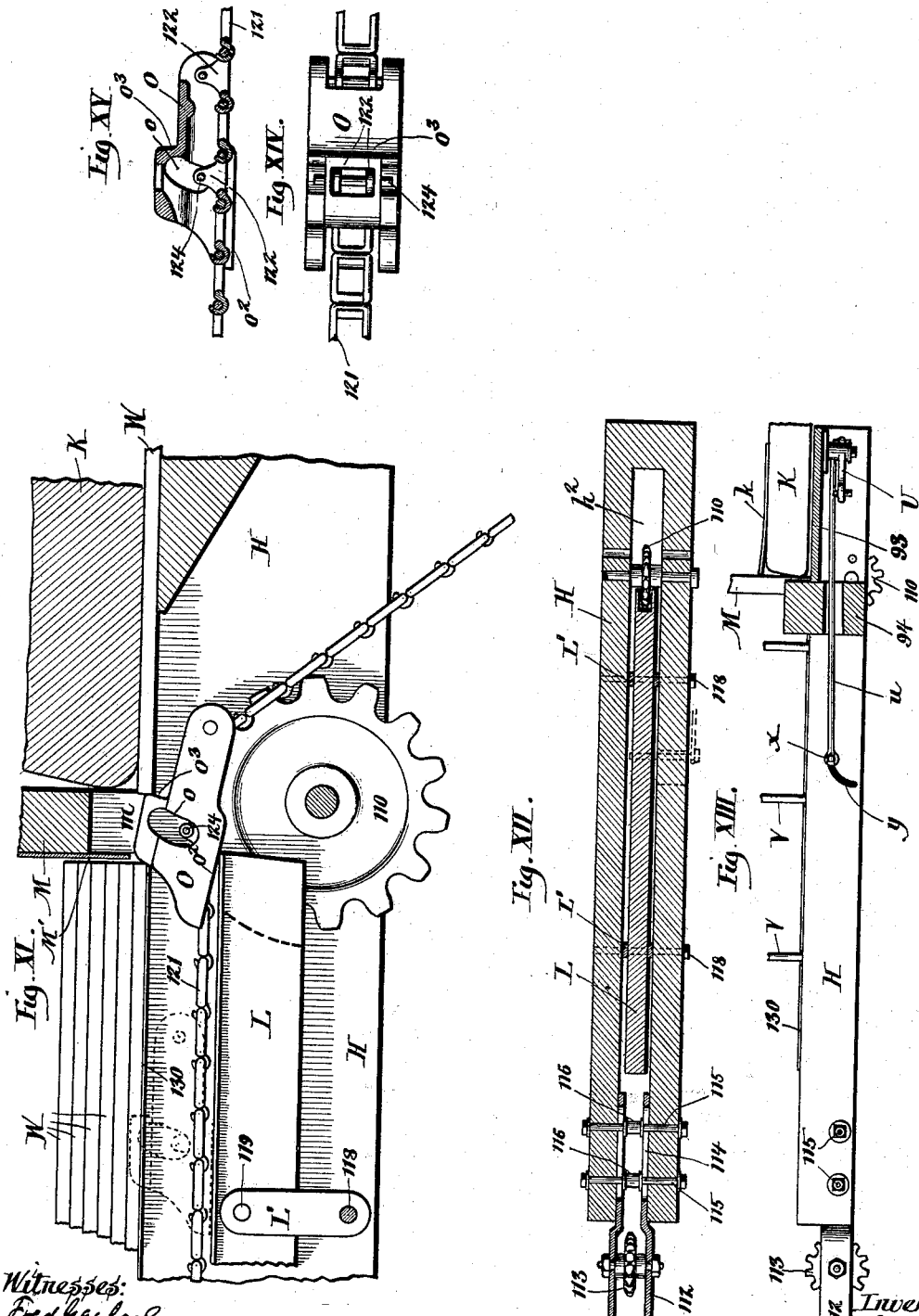

No. 609,387. Patented Aug. 16, 1898.
G. P. FISHER, Jr. & J. REIF, Jr.
MACHINE FOR MAKING SLAT AND WIRE FABRIC.
(Application filed Apr. 25, 1898.)
(No Model.) 14 Sheets—Sheet 9.
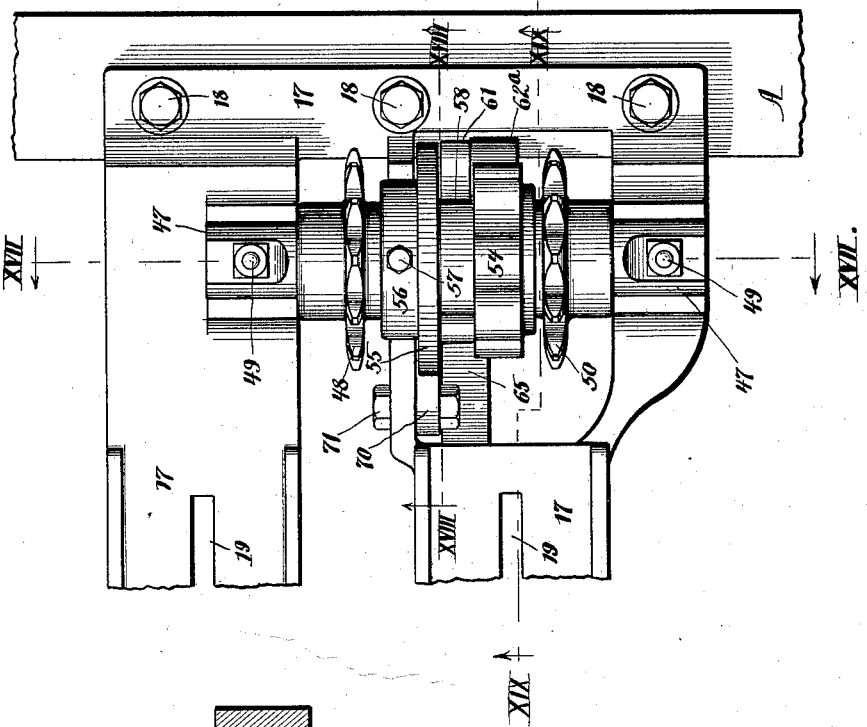

No. 609,387. Patented Aug. 16, 1898.
G. P. FISHER, Jr. & J. REIF, Jr.
MACHINE FOR MAKING SLAT AND WIRE FABRIC.
(Application filed Apr. 25, 1898.)
(No Model.) 14 Sheets—Sheet 10.
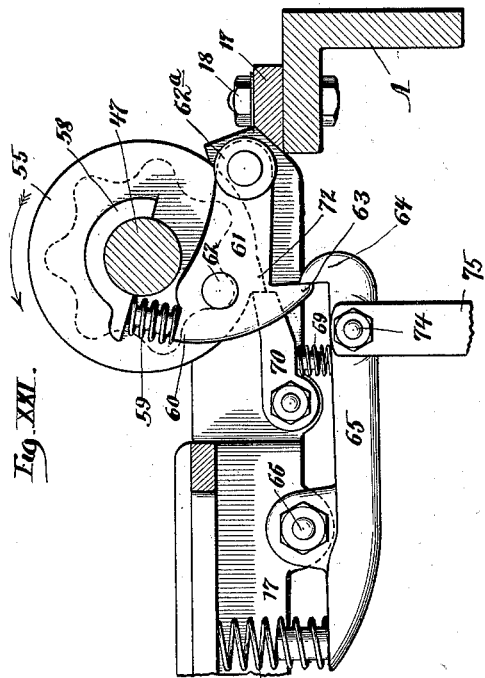
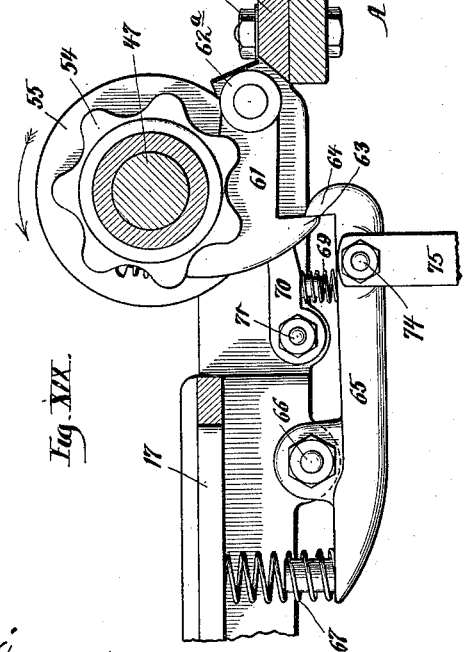
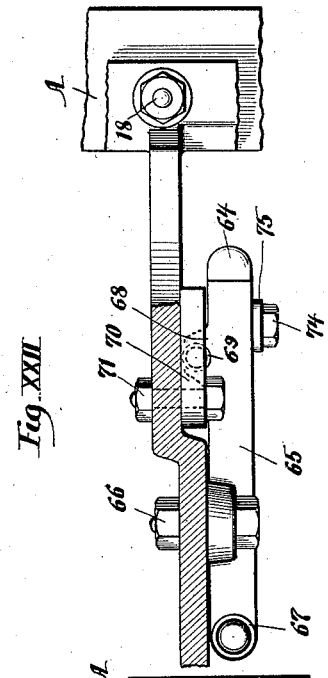
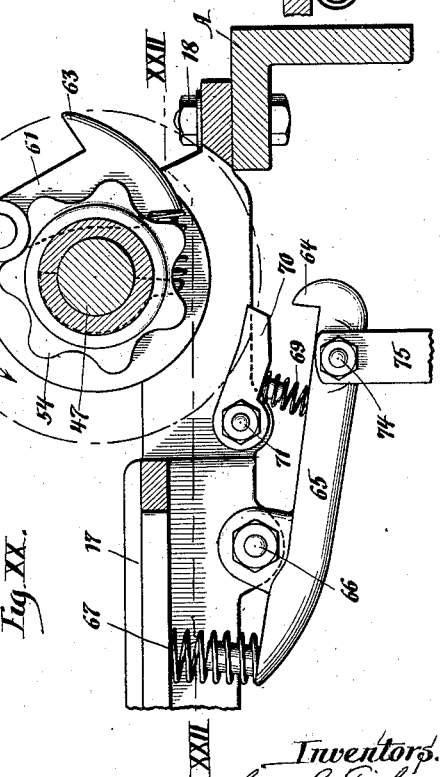

No. 609,387. Patented Aug. 16, 1898.
G. P. FISHER, Jr. & J. REIF, Jr.
MACHINE FOR MAKING SLAT AND WIRE FABRIC.
(Application filed Apr. 25, 1898.)
(No Model.) 14 Sheets—Sheet 11.
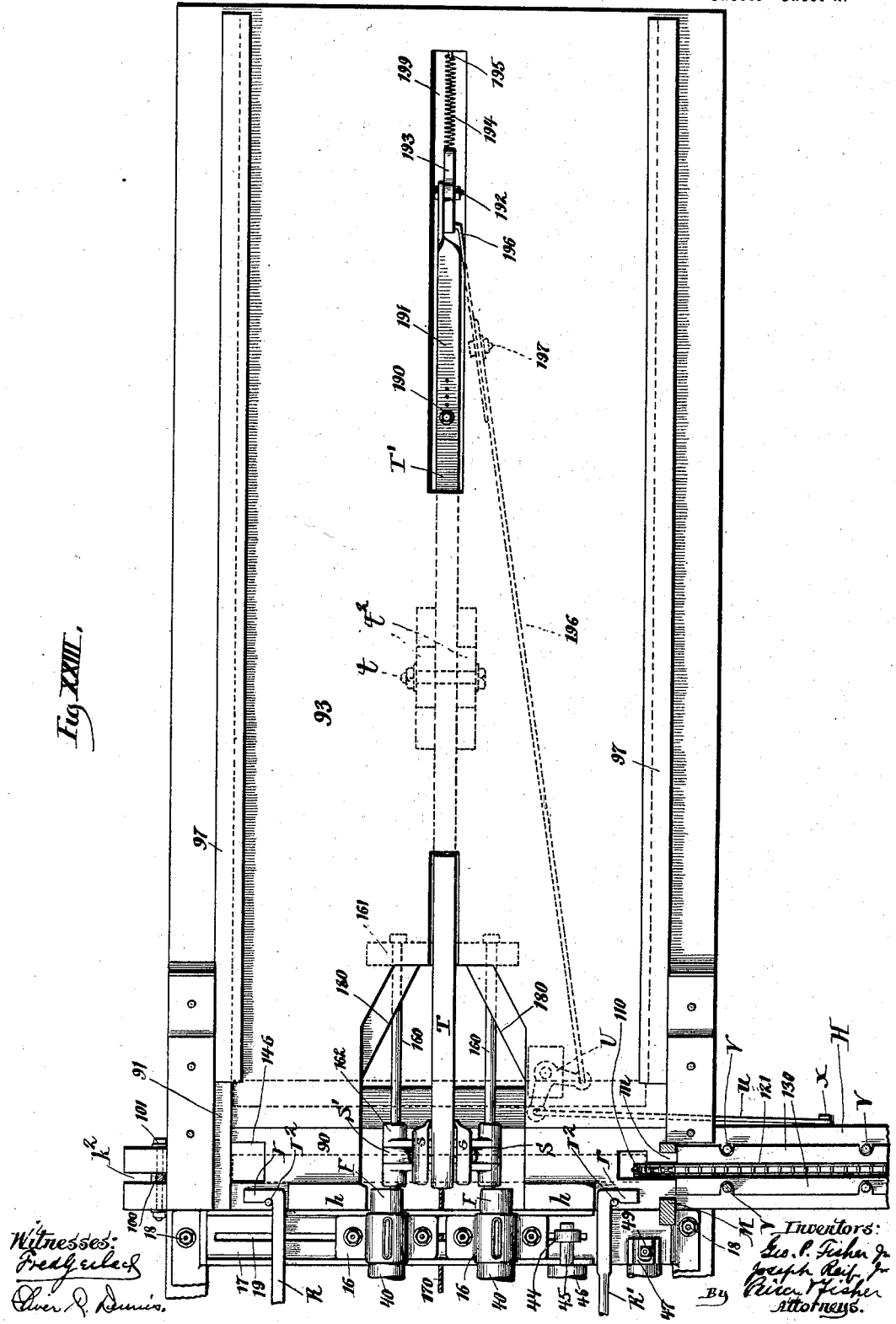
Witnesses:
Inventors:
By Attorneys.

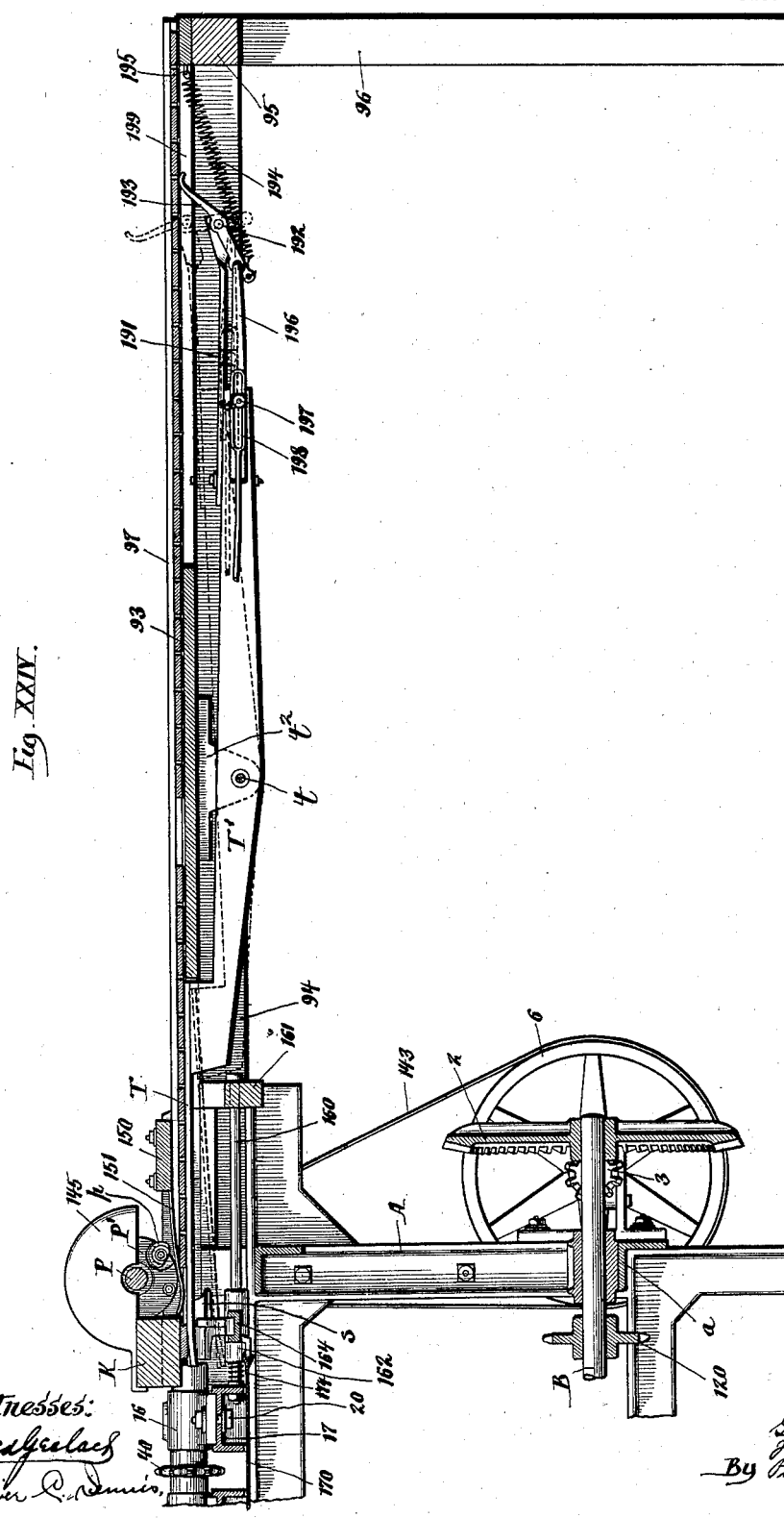

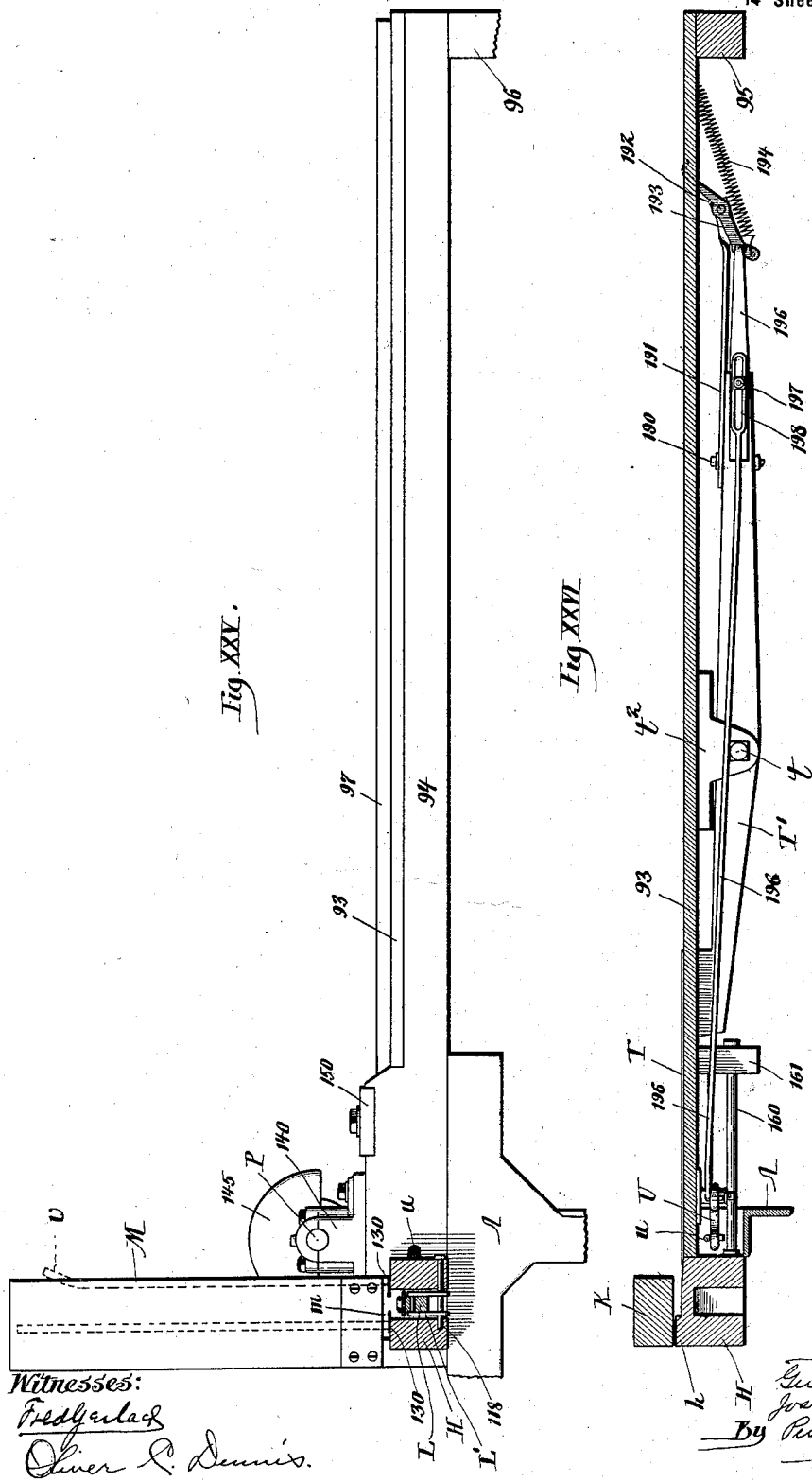

No. 609,387. Patented Aug. 16, 1898.
G. P. FISHER, Jr. & J. REIF, Jr.
MACHINE FOR MAKING SLAT AND WIRE FABRIC.
(Application filed Apr. 25, 1898.)
(No Model.) 14 Sheets—Sheet 14.
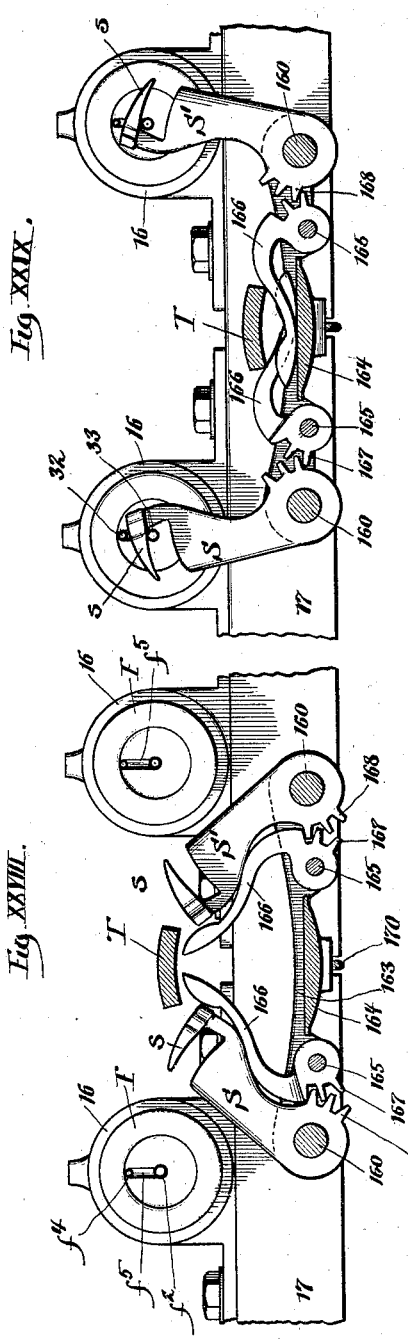
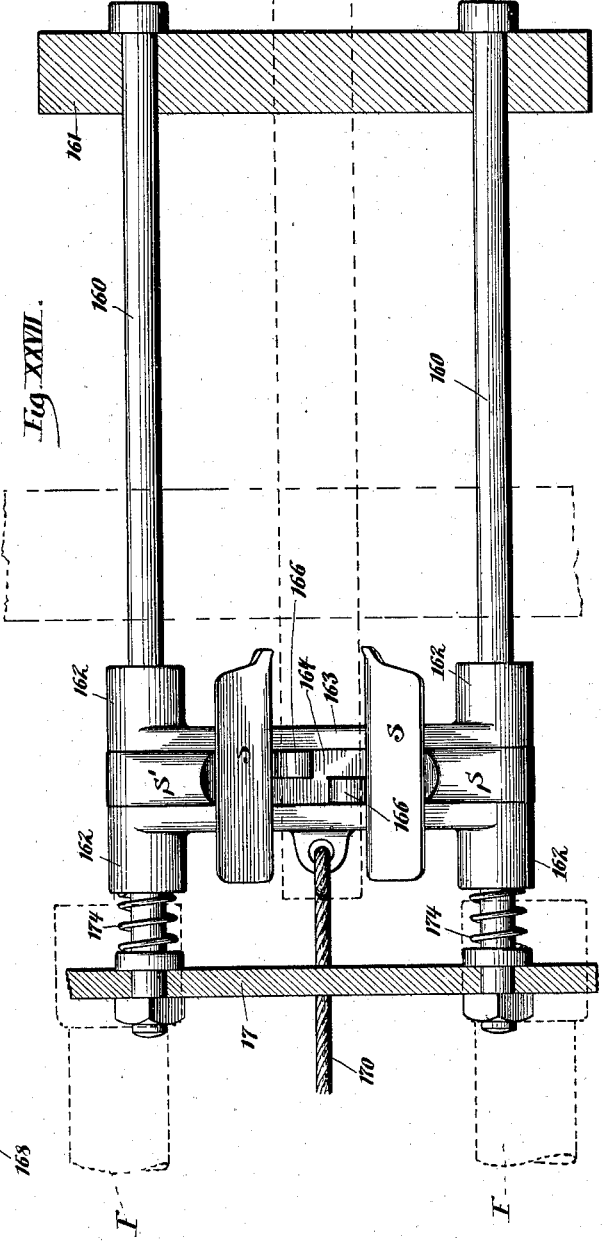

UNITED STATES PATENT OFFICE.

GEORGE P. FISHER, JR., OF CHICAGO, ILLINOIS, AND JOSEPH REIF, JR., OF HEBRON, INDIANA, ASSIGNORS TO THE HERCULES WOODENWARE COMPANY, OF CHICAGO, ILLINOIS.

MACHINE FOR MAKING SLAT-AND-WIRE FABRIC.

SPECIFICATION forming part of Letters Patent No. 609,387, dated August 16, 1898.

Application filed April 25, 1898. Serial No. 678,729. (No model.)

*To all whom it may concern:*

Be it known that we, GEORGE P. FISHER, Jr., a resident of Chicago, in the county of Cook, State of Illinois, and JOSEPH REIF, Jr., a resident of Hebron, in the county of Porter, State of Indiana, have invented certain new and useful Improvements in Machines for Making Slat-and-Wire Fabric, of which we do declare the following to be a full, clear, and exact description.

The invention has relation to that class of machines commonly known as "slat-and-wire-fabric-weaving" machines, in which slats, usually of wood, are connected together in series by suitable wires.

The invention consists in the various improvements hereinafter described, illustrated in the accompanying drawings, and particularly pointed out in the several claims at the end of this specification.

Figure I is a plan view of the machine, parts being broken away. Fig. II is a view in vertical cross-section on line II II of Fig. I. Fig. III is a view in vertical cross-section on line III III of Fig. 1. Fig. IV is a view in vertical longitudinal section on line IV IV of Fig. I. Fig. V is a view in horizontal section on line V V of Fig. IV. Fig. VI is an enlarged view, in vertical longitudinal section, through one of the spindles and its bearings, parts of the main frame and a portion of the wooden fabric being shown in cross-section. Fig. VII is a detail view, partly in plan and partly in horizontal section, through one of the spindles and spool-holders and adjacent parts. Fig. VIII is a view in central vertical longitudinal section through the spindle and parts shown in Fig. VII. Fig. IX is a view in cross-section through the upper part of the main frame and through the spindles, the gearing for driving the spindles and other parts being shown in elevation. Fig. X is a detail view in elevation of the drive-bar, whereby a reciprocating motion is imparted to the spindles, the spindles being shown in cross-section. Fig. XI is an enlarged detail view, in vertical longitudinal section, (see Fig. II,) through the inner end of the slat-hopper and adjacent parts, certain parts being shown in elevation. Fig. XII is a detail view, in horizontal section, through the mechanism beneath the slat-hopper. (See Fig. II.) Fig. XIII is a view in side elevation of the bottom of the slat-hopper, this view being from the side opposite that shown in Fig. II. Fig. XIV is a detail plan view of one of the slat-feeding dogs and part of its driving-chain. Fig. XV is a view in vertical longitudinal section through the dog shown in Fig. XIV. Fig. XVI is an enlarged detail plan view of the clutch mechanism whereby revolution is intermittently imparted to the spindles. Fig. XVII is a view in vertical section on line XVII XVII of Fig. XVI. Fig. XVIII is a view in vertical section on line XVIII XVIII of Fig. XVI. Fig. XIX is a view in vertical section on line XIX XIX of Fig. XVI. Fig. XX is a view similar to Fig. XIX, but showing the parts in different position. Fig. XXI is a view similar to Fig. XIX, with the clutch-wheel omitted. Fig. XXII is a view in horizontal section on line XXII XXII of Fig. XX. Fig. XXIII is a plan view showing the delivery-table and the parts carried by the rear end of the main frame, the crozing mechanism and certain other parts being removed. Fig. XXIV is a view in vertical longitudinal section through the parts shown in Fig. XXIII, the crozing mechanism being also shown in position and various parts being shown in elevation. Fig. XXV is a view in side elevation of the delivery-table and of the end portion of the main frame, the bottom of the slat-hopper being shown in vertical section. Fig. XXVI is a detail view in vertical longitudinal section through the "mat-supporting" table, this section being taken adjacent the outer edge of the table. Fig. XXVII is an enlarged detail plan view of what are termed the "dummies" and their supports. Fig. XXVIII is a view in vertical cross-section through the dummy-supporting bars shown in Fig. XXVII, looking toward the spindle-heads. Fig. XXIX is a view similar to Fig. XXVIII, but showing the parts in different position.

The frame A of the machine will be suitably constructed from wood or metal (preferably cast-iron) to sustain the various parts of the mechanism. Between the side bars of the frame extend the cross-bars $a$ $a'$, (see Fig. V,) whereon is journaled the main drive-shaft B, the outer end of this drive-shaft having keyed thereto a beveled gear-wheel 2, that engages with the pinion 3 upon a short shaft 4, sustained within suitable bearings 5 and carrying pulleys 6, 7, and 8. The pulley 6 is for driving the cutter-head shaft, as will be hereinafter described, and the pulleys 7 and 8 are respectively fast and loose pulleys adapted to receive the drive-belt, by which motion will be transmitted to the machine from a suitable source of power. Upon the inner end of the shaft B is fixed a beveled pinion 10, that meshes with a beveled gear-wheel 11, that is fixed to a counter-shaft C, the ends of this counter-shaft being journaled within suitable boxes 12 upon the side bars of the main frame. Upon the counter-shaft C are keyed the cam-wheels C' and C$^2$, each of these cam-wheels being furnished with cam grooves or ways $c$, as clearly shown by Fig. IV of the drawings. The cam-groove $c$ of each of the cam-wheels C' and C$^2$ receives a friction-roll 14, that is carried by and projects laterally from the end of a shifting lever D. Preferably there are two shifting levers D and preferably, also, two cam-wheels, as shown, and the levers D are pivotally sustained by lugs 13, projecting inwardly from a cross-bar of the main frame, (see Figs. IV and V,) while the upper ends of the levers D are perforated to receive the ends of the rods 15, the opposite ends of which rods connect with the ends of the drive-bar E, (see Fig. I,) whereby a reciprocating movement will be imparted to the spindles F, that serve to twist together the wires that connect the slats of the fabric. Each of the spindles F has its rear end provided with an enlargement $f$, around which is formed an annular groove to admit a rib $e$, (see Figs. VIII and X,) projecting inwardly from the drive-bar E. The drive-bar E is shown as formed of upper and lower sections, that are bolted together, as at $e'$, as this affords a convenient means for connecting the drive-bar to the spindles. The spindles F are journaled in boxes 16, mounted upon a cross-plate or frame 17, that is bolted, as at 18, to the top of the main frame of the machine, the frame or cross-plate 17 being formed with long slots 19, through which pass the bolts 20, whereby the journal-boxes 16 of the spindles may be adjusted transversely in order to enable the wires to be spaced any desired distance apart.

From the enlargement $f$ at the end of each spindle project the rods 21, that pass through holes formed in the cross-head 22 at the inner end of a spool-carrier 23, that is revolubly mounted upon a tubular shaft 24. The rear end of the shaft 24 is fixed within a sliding head-block 25, being preferably held in place by a set-screw 26, and the inner end of the tubular shaft 24 is provided with a collar 27 to prevent the longitudinal movement of the spool-carrier 23. The head-block 25 is preferably of casting, having at its top a raised portion, as shown, to receive the outer end of the tubular shaft 24 and having its lower edge formed with an angular lip 28 to engage the edge of a bar extending across the top of the main frame of the machine at its front end. Holes are formed in the base of the head-block 25 to admit the adjusting-bolts 29, the hooked ends of which engage the lower portion of the transverse bar, whereon the head-block rests, as clearly seen in Fig. VIII. Each of the spool-carriers 23 is provided with a pivot-bolt 30, whereon is journaled a spool 31, that carries the small wire 32, (commonly termed the "tie-wire,") whereby the slats are fastened to the main wire 33, that passes through the tubular shaft 24 and through the center of the corresponding spindle F.

By reference to Figs. I and VIII it will be seen that the main wire 33 passes through a central hole $f^2$ in the head of the spindle F, while the binding-wire 32 passes through a channel $f^3$ in the wall of the spindle F and through a continuation of this channel $f^4$ in the spindle-head, the outlet of the channel $f^4$ being considerably at one side of the center of the spindle-head. By reference to Figs. VI and VIII it will be observed that the holes or channels $f^2$ and $f^4$ are connected by a cross-channel $f^5$, the purpose of which will be hereinafter set forth.

From the construction of parts as thus far defined it will be seen that when revolution is imparted to the main drive-shaft B and from it to the counter-shaft C the cam-wheels C' and C$^2$ will be revolved, and as these cam-wheels revolve the driving-levers D will be shifted back and forth from the position shown by full lines to the position shown by dotted lines in Fig. IV of the drawings. As the driving-levers are thus oscillated they will carry forward and backward the drive-bar E, which bar in turn will impart a reciprocating movement to the spindles F. It will also be apparent that as the spindles F are thus reciprocated the arms 21 at the ends of these spindles will slide freely through the cross-heads 22 at the inner ends of the spool-carriers 23. It is obvious, however, that when revolution is imparted to the spindles F by mechanism to be next described corresponding revolution will be transmitted through the arms 21 to the spool-carriers 23.

Upon each of the spindles F and between the journal-boxes 16 of such spindles is mounted a sprocket-wheel 40, this wheel being provided with a key adapted to fit in a long seat or slot 41, formed in the outer face of the side wall of the spindle, (see Figs. VIII and IX,) so that while the sprocket-wheel 40 serves to impart revolution to the spindle it permits the spindle to slide back and forth through the sprocket-wheel. With the sprocket-wheels 40 of each of the spindles F engages a sprocket-chain 42, this chain being preferably passed around the sprocket-wheels 40, as indicated in Fig. IX of the drawings, so as to impart rotation to the spindles in opposite directions.

Upon the top of the frame 17 rise suitable journal-bolts or standards 44, the upper ends of which carry a shaft 45, whereon is mounted an idler sprocket-wheel 46, over which the chain 42 passes, and at the end of the frame 17 is journaled a shaft 47, on which is loosely mounted a sprocket-wheel 48, around which the chain 42 also passes. Inasmuch as the spindles F will be revolved only at intervals, it will be understood that a suitable clutch mechanism will be interposed between the spindles and the constantly-driven parts of the mechanism, and the preferred form of clutch mechanism is that illustrated more particularly in Figs. XVI to XXI of the drawings. The shaft 47, whereon the sprocket-wheel 48 is journaled, is bolted, as at 49, to the cross-frame 17, and upon the shaft 47 is revolubly mounted a sprocket-wheel 50, from which a sprocket-chain 51 leads to a sprocket-wheel 52, that is keyed upon the main shaft B, as clearly seen in Fig. II of the drawings. The hub of the sprocket-wheel 50 is preferably screw-threaded, as at 53, to enter a correspondingly-threaded opening in the detent-wheel 54, that revolves constantly with the sprocket-wheel 50. Upon the shaft 47 and between the sprocket-wheels 48 and 50 is mounted a disk 55, having an annular lateral flange 56, that is connected, as by a set-screw 57, with the hub of the sprocket-wheel 48. Upon the opposite side of the disk 55 is formed a segmental flange 58, (see Fig. XXI,) against which bears a coil-spring 59, that is carried by a stud projecting from the short end 60 of the detent-lever 61, that is pivoted, as at 62, upon a pin projecting from the side of the disk 55. The detent-lever 61 carries at one side of its longer arm a friction-roll $62^a$, adapted to engage with the teeth or notches of the detent-wheel 54, as seen in Fig. XX of the drawings, being held in such engagement by the coil-spring 59. The detent-lever 61 is formed with a lug 63, adapted to be engaged by a hook or projection 64 on the end of a latch-bar 65, that is pivotally connected, as at 66, to the under side of the frame 17. Upon the rear end of the latch-bar 65 is a stud carrying a coil-spring 67, that bears against the under side of the frame 17 and tends to normally hold the latch-bar in the position seen in Figs. XIX and XXI of the drawings. Upon the side of the latch-bar 65 is formed the short lateral arm or extension 68, (see Fig. XXII,) against which bears a coil-spring 69, the opposite end of which encircles a stud projecting from a catch 70, that is pivoted, as at 71, to the frame 17. Catch 70 is designed to engage with a notched shoulder or offset 72 on the periphery of the disk 55, and this engagement will occur when the hooked end 64 of the lever 65 engages with the offset 63 of the detent 61, and the purpose of the catch 70 is to prevent any "backlash" or reverse motion incident to the sudden stopping of the spindles, as will presently more fully appear.

To the latch-bar 65 is pivotally connected, as at 74, a rod 75, the lower end of which rod is pivotally connected, as at 76, (see Figs. II and IV,) to a tripper-lever 77, that is pivotally sustained on a pin 78, passing through lugs that rise from the cross-bar $a'$ of the main frame. The tripper-lever 77 is formed with a series of holes 80, through any one of which a pin 78 may be passed, the purpose of these holes being to adjust the tripper-lever in order to determine the time of action of the clutch mechanism, and consequently the number of revolutions of the spindle, as will hereinafter more fully appear. The outer or free end of the tripper-lever 77 extends adjacent to the side of the cam-wheel $C'$, (see Figs. I and IV,) and this side of the cam-wheel is provided with a stud or other suitable projection 82, (see dotted lines, Fig. IV,) adapted to contact with the under side of the tripper-lever 77 and lift the same as the cam-wheel $C'$ revolves. It is obvious that as the cam-wheel $C'$ revolves in the direction of the arrow in Fig. IV it will strike the under side of the tripper-lever 77 and rock this lever about the pivot-pin 78. As the outer end of the tripper-lever 77 is lifted the inner end will be depressed and will draw down the rod 75, causing this rod to draw the latch-bar 65 downward until its hooked end 64 passes from engagement with the shoulder or offset 63 on the detent 61. (See Figs. XIX, XX, and XXI.) When the hooked end 64 of the latch-bar 65 has been withdrawn from engagement with the shoulder 63 of the detent 61, the coil-spring 59 will rock the detent 61 about its pivot and cause the roller 62 to engage with the scalloped clutch-wheel 54. Inasmuch as the clutch-wheel 54 is fastened to the constantly-revolving sprocket-wheel 50, it is manifest that rotation will immediately be imparted through the detent 61 and the disk 55 to the sprocket-wheel 48, and from this sprocket-wheel revolution will be imparted by the sprocket-chain 42 to the sprocket-wheels 40 upon the spindles F. (See Fig. IX.) It will also be seen that the detent 61 will remain locked to the clutch-wheel 54 so long as the hooked end 64 of the latch-bar 65 remains in retracted position, which will be determined by the length of time that the stud or offset 82 of the cam-wheel $C'$, Fig. IV, is in engagement with the free end of the tripper-lever 77. It will also be seen that by inserting the pin 78 in any one of the holes 80 of the tripper-lever the length of time during which the stud or offset 82 shall hold the tripper-lever in raised position may be varied, and consequently the time during which the clutch shall cause the spindles F to be driven may be correspondingly varied. In this way the number of revolutions imparted to the spindle during each revolution of the cam-wheels $C'$ and $C^2$ may be determined, and by this means the number of coils of the small tie-wires 32 about the main binding-wires 33 may be varied and the distance between the slats of the fabric may be regulated.

By reference more particularly to Figs. I, IV, and VI of the drawings it will be seen that if the spindles are in the retracted position there shown and a slat W be fed in front of the spindles and the cam-wheels C' and C² have revolution imparted thereto in the direction of the arrow in Fig. IV the cams $c$ will first rock the levers D, so as to cause the spindles to move from the position shown by full lines, Figs. IV and VI, to the position shown by dotted lines, and as the spindles are thus moved they will advance the slat W and at the same time advance any slats that may have been previously fed into the machine. About the time that the cams $c$ have moved the spindles to the position shown by dotted lines the stud or offset 82 on the cam-wheel C' will rock the tripper-lever 77, and the rocking of this tripper-lever will cause the latch-bar 65 (see Figs. XIX to XXI) to be disengaged from the detent 61, and the spring 59 will cause the detent 61 to engage the clutch-wheel 54 and lock the constantly-revolving sprocket-wheel 50 with the sprocket-wheel 48, and through the medium of the sprocket-chain 42 revolution will be imparted to the spindles F and the small tie-wire 32 will be wrapped around the main binding-wire 33. The revolution of the spindles F will continue until the stud or offset 82 passes from engagement with the under side of the tripper-lever 77, when the tripper-lever will again drop to the position shown by full lines in Fig. IV, and the spring 67 will cause the hooked end 64 of the latch-bar 65 to move upward into position to engage the shoulder or offset 63 of the detent 61, thereby rocking the detent about its pivot and causing the roller 62ª to pass from engagement with the scalloped clutch-wheel 54. The lifting of the latch-bar 65 will also cause the pivoted catch 70 to move from the position seen in Fig. XX to that seen in Fig. XXI, and in this position the free end of the latch 70 will engage with the shoulder or offset 72 on the disk 55, and thus prevent any backlash or reverse motion of the parts incident to the sudden stoppage of the spindles.

By reference to Figs. VI and VIII of the drawings it will be observed that the free ends of the spindles F are provided with vertical grooves $f^5$, and it will be seen that as the spindles revolve to twist the tie-wires 32 around the main binding-wires 33 the tie-wires will be drawn into the channels or grooves $f^5$. These grooves or channels $f^5$ thus serve to lay the tie-wires 32 around the main binding-wires 33 evenly and prevent the piling up of the coils of the tie-wire one upon another, as would be apt to occur were no such vertical grooves between the channels of the tie-wires and binding-wires provided. It is obvious that the revolution of the spindles F, and consequently the wrapping of the tie-wires upon the binding-wires, will continue so long as the stud or offset 82 is in engagement with the tripper-lever 77; but the revolution of the spindles F will cease when the stud 82 passes from engagement with the tripper-lever 77. As soon as the stud or offset 82 passes from engagement with the tripper-lever 77 the cams $c$ will operate to rock the levers D from the position seen by dotted lines to the position shown by full lines in Fig. IV, and the spindles F will be in like manner retracted to the position seen by full lines in Fig. VI, so that a new slat may be fed in front of the spindles. The parts of the machine are so relatively arranged that the spindles F shall stop with the wires 32 and 33 in vertical alinement, as seen in Fig. VI, so that the slats can be fed into the spaces between the wires.

The mechanism whereby the automatic feeding of the slats is effected will next be described.

At the top and extending to one side of the main frame is a suitable rack or hopper, wherein will be held the slats W to be fed into the machine. This rack or hopper comprises a base or support H, (see Figs. I, II, XI, XII, and XIII,) that may be formed from a beam of wood suitably bolted to the main frame, and in the construction shown this beam H extends inward partially over the main frame. The sides of the hopper are preferably formed of vertical rods V, the rods at one side having their tops preferably bent or flared, as at $v$, (see Fig. I,) so as to permit the more ready insertion of the slats W into the hopper. The end of the hopper is shown as comprising a plate M, that rises from the support H of the hopper. (See Figs. II and XXIII.) The bottom of the plate M is formed with an opening $m$ to permit the slats to be fed from the hopper, and preferably a suitable gate M' will be placed inside the hopper adjacent to this opening in order to regulate the size of the opening in conformity to the thickness of the slats that are fed into the machine. The gate will be adjustably attached in the usual manner to the inner face of the plate M.

On top of the main frame, at the side opposite the slat-hopper, is placed a slat-support 90, that is bolted to the top of the main frame, the upper surface of this support 90 being in line with the top of the support H, as clearly seen in Fig. II. From the surface of the support 90 rises a ledge 91, (see Figs. II and XXIII,) that serves as a stop or guide for the ends of the slats W. From the top of the supports H and 90 extends the table 93, the surface of which is flush with the upper surface of the supports H and 90, this table 93 being sustained by the side rails 94, (see Figs. XXIII and XXV,) that rest upon the top frame of the machine and upon a suitable cross-bar 95, that is sustained by the legs 96. (See Fig. XXIV.) At each side of the top of the table 93 and running lengthwise thereof is placed a rabbeted guide 97, beneath which the ends of the slats will pass and which serves to hold the slats against the surface of the table as they are successively pushed along. (See Figs. VI, XXIII, and XXIV.)

The upper surface of each of the supports H and 90 is provided with a raised shoulder $h$ (see Figs. XXIII and XXVI) to aid in guiding the slats as they are delivered from the hopper into the machine.

Above the surface of the support 90 and of that part of the support H extending over the top of the main frame (see Figs. I and II) is a presser-bar K, one end of which is provided with a spring-latch $k$, adapted to engage with the notch or seat $k'$ in the end plate M of the slat hopper or rack. The opposite end of the presser-bar K is formed with a slot $k^2$, adapted to receive a retaining-bolt 100, that is pivoted, as at 101, to the support 90 and is provided with an adjusting-nut 102, a spring 103, and a washer 104, whereby the pressure of the bar K may be regulated. The end of the bar K is rounded, as seen in Fig. II, so that the retaining-bolt 100 can be swung freely into and out of engagement with the bar, and when the bolt 100 is disengaged from the bar the bar can be raised so as to permit the spring-latch $k$ to be withdrawn from the notch or seat $k'$ in order that access may be had to the underlying parts of the machine.

By reference more particularly to Figs. II, XI, and XII of the drawings it will be seen that the support H is formed with a long channel $h^2$, adjacent the inner end of which is journaled a sprocket-wheel 110, and at the outer end of the support H and preferably extending within the channel $h^2$ are the arms of a bracket 112, that sustains a sprocket-wheel 113. The bracket 112 has its arms provided with the long slots 114, through which pass the bolts 115, suitable space-blocks 116 being carried by the bolts, so that the bolts will serve to securely hold the bracket in place. The long slots 114 permit the adjustment of the bracket 112 and sprocket-wheel 113, for the purpose to be presently stated, and preferably also the sprocket-wheel 110 may be adjusted by inserting its pivot-bolt in either of the several holes therefor, as shown in Fig. XII. Within the channel $h^2$ of the support H is mounted a shifting table L, that is mounted upon swinging links L', the lower ends of these links being pivoted, as at 118, to the support H, while the upper ends of the links are pivoted, as at 119, to the table L. (See Figs. II, XI, and XII.) One of the links L' is preferably provided with a handle L², whereby the shifting of the table L may be effected manually when desired. Over the sprocket-wheels 110 and 113 and around a sprocket-wheel 120, that is keyed upon the main drive-shaft B, passes a sprocket feed-chain 121, that carries one or more feed-dogs O. Each of these dogs O is pivoted to upright arms 122, that rise from certain links of the chain 121, (see Figs. XIV and XV,) and preferably the dogs O are formed with the slots $o$, through which pass the ends of a pin 124, that serves to retain the corresponding dog against displacement. Each of the dogs O is preferably chambered, as seen in Fig. XV, and is formed with feet or ledges $o^2$, adapted to ride upon the surface of the table L, Fig. XI. The top of each dog O is formed with a shoulder $o^3$, adapted to engage with the outer end of the lowermost slat W within the hopper. By reference to Figs. XI, XXIII, and XXV it will be seen that upon the top of the support H are placed the metal strips 130, that serve to partially close the channel $h^2$ of the support H, leaving simply room for the easy passage of the shouldered portion $o^3$ of the dog O, and upon the plates 130 the mass of slats W will rest.

From the foregoing description it will be seen that when revolution is imparted to the main drive-shaft B (see Fig. II) corresponding revolution will be given to the sprocket-wheels 110 and 113, over which passes the feed-chain 121, thus causing the dogs to move in the direction of the arrow, Fig II, and over the table L, which normally occupies the position shown by full lines in the drawings. As the dogs O successively pass onto the outer end of the table L the shoulders $o^3$ of the dogs will engage the outer end of the lowermost slat W, thereby forcing this slat through the opening $m$ of the hopper and across the surface of the supports H and 90, as clearly shown in Figs. II and XI of the drawings. As the dogs O pass onto the table L the feet $o^2$ of the dogs will bear upon the table, thus holding the dogs in the elevated position seen in Fig. XV of the drawings. As soon, however, as the feet $o^2$ of the dogs pass from off the inner end of the table L the weight of the dogs will cause them to turn about their pivots and the shoulders $o^3$ to drop from the engagement with the slat W. In this way each slat can be deposited with exactness at the proper point in front of the spindles F. If desired, the inner end of the table L may have an adjustable plate thereon in order to vary the point at which the dog shall release the slats. It will be understood, of course, that the dogs O will be set at such points that the slats W will be delivered into the machine while the spindles F are in the retracted position shown by full lines in Figs. I, II, VI, and XXIII of the drawings, and the sprocket-wheel 120 will be of proper size and the chain 121 of proper length to insure the movement of the dogs in correspondence with the movements of the spindles.

After a slat has been delivered by one of the dogs O immediately in front of the spindles F, as shown by full lines in Figs. II and VI and by dotted lines in Fig. XXIII, the spindles will be advanced by the cam-wheels C' and C², thereby moving the slat onward, and at the same time pushing onward all slats that have been previously fed into the machine. It will be understood, of course, that as the dogs O introduce the slats into the machine the ends of the slats will pass between the large and small wires, as clearly seen in Fig. VI of the drawings. When the spindles F have advanced the slats, revolution will be imparted to the spindles, as hereinbefore described, causing the small wire 32 to be wrapped about the large wire 33 with the proper number of coils, after which the spindles F will be withdrawn and a new slat will be fed in.

The machine shown in the accompanying drawings, while adapted for the manufacture of slat-and-wire fabric for any of the purposes for which such fabric is ordinarily employed, is more especially designed for manufacturing the fabric to be used for the bodies of barrels, and in order to properly croze or trim the ends of the slats the mechanism next to be described is employed. Across the main frame of the machine, and preferably supported upon pillow-blocks 140, mounted upon the ends of the side rails 94, extends the shaft P, carrying cutter-heads P', that are provided with suitable knives $p$, adapted to form the croze and shape the ends of the slats to form the chime of the barrel. The cutter-heads P' will be of any usual or suitable construction and need not be particularly described. Upon the outer end of the shaft P is a pulley 142, from which leads a belt 143 to the large pulley 6, that is keyed to the shaft 4. (See Figs. I, V, and XXIV.) Above the cutter-heads P extend the hoods 145, preferably of sheet metal, and partially encircling the cutter-heads, and preferably the supports H and 90 will be formed with cut-away spaces 146 for the discharge of the chips from the cutter-heads. (See Fig. XXIII.) One of the hoods 145 is shown as attached to the presser-bar K, (see Figs. I and XXIV,) while the other hood 145 is provided with a flange that will be connected to the plate M of the hopper. (See Fig. II.)

While the construction of the cutter-heads is not novel, the arrangement of cutter-heads so that the crozing of the slats will be substantially effected before the twisting of the wires is a feature of importance. In machines heretofore used for the manufacture of slat-and-wire fabric for barrels it has been customary to locate the cutter-heads in such position as to croze and trim the slats after the twisters or spindles that operated to bind the slats together. This construction has been found objectionable because of the tendency of the cutter-heads to jam the slats together, and thus destroy the accurate spacing of the slats. By locating the cutter-heads in such position that the crozing of the slats is completed, or approximately so, before the wires are twisted about the slats all danger of jamming the slats together or varying the spaces between them is avoided. For this reason it will be seen, by reference more particularly to Fig. VI of the drawings, that the spindles F have such extent of movement that they will advance the slats practically beyond the path of the cutter-heads before the twisting of the wires occurs.

In order to aid the spindles F in advancing the slats beneath the cutter-heads, it is preferred to employ the feed-arms R and R', (see Figs. I and XXIII,) the outer ends of these arms being connected to the drive-bar E, while their inner ends extend over the frame 17 and between the presser-bar K and the surface of the supports 90 and H, whereon they rest and are supported in manner free to slide. Preferably the inner ends of the bars R and R' are formed with the angular portion $r$ to afford a broader bearing upon the edges of the slats, and pins $r^2$ may be provided to aid in guiding the bars R R'. The bars R R' are so located as to bear upon the edges of the slats very close to the path of the cutter-heads P', and thus more effectively aid in presenting the slats to the action of the cutter-heads. Across the top of the main frame, beyond the cutter-heads, is extended a bar 150, to which are bolted the presser-feet 151, that are preferably formed of spring metal, with their free ends slightly upturned, as seen in Figs. I and XXIV, to permit the slats W to be advanced beneath the presser-feet. These presser-feet are arranged in close proximity to the cutter-heads and serve to hold the slats down during the crozing operation and will also aid in preventing any reverse movement of the slats as the spindles are retracted.

In order to divide the woven mat or fabric into proper lengths to form barrels or like packages, the mechanism next to be described is preferably employed. Upon suitable rods 160, that are supported in any convenient manner—as, for example, by the frame 17 at one end and a bar 161 depending from the table 93 at the other end, (see Figs. XXIII and XXVII,)—is mounted in manner free to slide what, for convenience, are termed the "dummies" S and S'. (See Figs. XXVII and XXIX.) At each side of the dummies S S' are arranged the hubs 162 of the dummy-frame, the side bars 163 of this frame being connected by a web or plate 164. Upon pins 165, that extend between the side bars 163 of the dummy-frame, are pivotally mounted the levers 166, the lower portions of these levers being provided with teeth 167, that mesh with corresponding teeth 168, formed upon the lower portions of the dummies S S'. The dummies S S', it will be understood, are free not only to slide on the rods 160, but are also pivoted upon these rods, so as to turn from the position seen in Fig. XXVIII to the position seen in Fig. XXIX of the drawings. To one side of the dummy-frame is connected a rope or cable 170, (see Figs. I, III, IV, XXIII, and XXVII,) that is trained over a pulley 171 at the front of the main frame, and to this rope 170 is connected a weight 172, that serves to normally hold the dummies in the idle position shown in Figs. XXIII and XXVII of the drawings. Preferably cushion-springs 174 will be mounted upon the rods 160 in order to relieve the jar as the dummy-frame is retracted by the weight 172, as will presently more fully appear.

The dummies S S' will come into action only at such times as the slat-feeding mechanism is thrown out of action, and when the dummies S S' are thrown into action they will (if the form of the invention above described is followed) swing from the position seen in Fig. XXVIII to the position seen in Fig. XXIX, at which time the blade $s$ upon the free ends of the dummies will pass between the small tie-wires 32 and the large binding-wires 33. The dummies will assume the position seen in Fig. XXIX just before the spindles F advance, and as the spindles advance the dummies will be pushed forward upon the rods 160 in the same manner as the slats are pushed forward by the spindles. So, also, the spindles will wrap the small tie-wires around the main binding-wires at the sides of the dummies, and as succeeding slats are fed into the machine and advanced the dummies S S' will be moved along the rods 160 until the outer edges of the dummies contact with the inclined bars 180 (see Fig. XXIII) beneath the table 93. As the dummies S S' are pushed outward after contacting with the inclined releasing-bars 180 they will be turned inward from the position seen in Fig. XXIX to the position seen in Fig. XXVIII, in which latter position they will be free from engagement with the slats and wire and will be promptly retracted to the normal position shown in Fig. XXIII by the weight 172 and cable 170.

In order to throw the slat-feeding mechanism out of action and the dummies S S' into action at the proper time, the mechanism next to be described may be employed. Over the levers 166 (see Figs. XXIII, XXIV, XXVIII, and XXIX) extends a dummy-shifting bar or lever T, the body of which bar, T', is pivoted, as at $t$, in suitable hangers $t^2$ beneath the table 93. By reference to Figs. XXIII and XXIV it will be seen that the end portion of the dummy-shifting bar is held at a higher plane than the body of the bar and about on a line with the upper surface of the table 93, the table 93 being formed with a cut-away space, as seen in Fig. XXIII, in order to permit the movement of the dummy-shifting bar. Upon the outer or rear end of the dummy-shifting bar is adjustably mounted, as at 190, a bar 191, to the free end of which is pivotally connected, as at 192, a pivoted trip-lever 193. The lower end of this trip-lever is connected to the inner end of a coil-spring 194, the opposite end of this spring being suitably connected, as at 195, to the cross-bar 95 at the outer end of the table 93. To the lower end of the trip-lever 193 is also connected a rod 196, that is formed of sections adjustably connected together by means of a bolt 197, fixed to one of the sections of the rod and passing through a slot 198 in the other section. (See Fig. XXVI.) The inner end of the rod 196 is connected to an elbow-lever U, (see dotted lines, Fig. XXIII,) that is pivotally sustained beneath the table 93, the opposite end of this elbow-lever being connected by a rod $u$ with a pin $x$, that is attached to the table L (see Figs. XII and XIII) and projects through a curved slot $y$, formed in the side of the support H. The rear end of the table 93 is formed with a slot 199 to admit the tripper-lever 193 to engage with the under side of the slats W, as shown in Fig. XXIV of the drawings.

From the foregoing description it will be seen that while the slats W are being automatically fed in front of the spindles F the dummies S S' will occupy the position seen in Figs. XXIII, XXIV, XXVII, and XXVIII, the dummy-shifting bar T being at such time above the levers 166, while the tripper-lever 193, that is connected to the opposite end of this bar, will bear against the under side of the slats W and will be held in position (shown by full lines Fig. XXIV) against the strain of the coil-spring 194. It will be understood, of course, that in the beginning of the operation of the machine the tripper-lever 193 will be held in position by merely slipping a slat beneath the guides 97 and over the free end of the tripper-lever; but after sufficient slats have been woven the tripper-lever will be automatically held in the position seen.

When a sufficient number of slats have been delivered to the machine to form the body of a barrel, the operator will with his hand remove from above the free end of the tripper-lever 193 the slat temporarily placed there, thereby permitting the tripper-lever to be drawn by the coil-spring 194 to the position seen by dotted lines in Fig. XXIV. As the tripper-lever is thus shifted it will shift the rod 196, connected to its lower end, and through the medium of the elbow-lever U, Fig. XXIII, and rod $u$ will swing backward and downward the table L. Consequently when the next feed-dog O passes onto the table its shoulder $o^3$ will not rise above the slot in the bottom of the hopper, and consequently will not engage the lowermost slat W in the hopper. Hence it will be seen that the feed mechanism will at such time be thrown out of action. The upward movement of the tripper-lever 193 will also permit the dummy-shifting bar T T' to rock about its pivot-point, causing the section T of the bar to press downward on the levers 166, and thereby rock these levers and the dummies S S' from the position seen in Fig. XXVIII to that seen in Fig. XXIX of the drawings. The spindles F will then be advanced in manner hereinbefore described and will move outward the dummies S S' and thereafter will wrap the small wire 32 about the larger wire 33, as set forth. As the dummies are thus moved outward the fabric that has been woven will also be moved outward, and the tripper-lever 193 will be forced from the position seen in dotted lines to the position shown in full lines by Fig. XXIV of the drawings, and at the same time the dummy-shifting bar T T' will be rocked back to the position shown by full lines in the drawings, thereby lifting the end T of this bar away from the levers 166. As the dummies S S' ride against the inclined releasing-bars 180, Fig. XXIII, the dummies will be turned inward until they are disengaged from the wires and slats, after which the weight 172 and rope 170 will withdraw the dummies to the position shown in Fig. XXIII of the drawings, and the dummies will occupy this position until the open space in the mat or fabric is advanced by the feeding in of the slats to a point above the tripper-lever 193, when the dummies will again be thrown into action.

It is manifest that the details of construction above set out may be varied within wide limits without departing from the spirit of the invention and that certain of the features may be employed without the adoption of the invention as an entirety.

Having thus described our invention, what we claim as new, and desire to secure by Letters Patent, is—

1. In apparatus of the character described, the combination with one or more revoluble spindles or twister-heads mounted in manner free to reciprocate, of mechanism for operating said spindles comprising a cam-shaft, grooved cam mechanism upon said shaft, lever mechanism engaged by said grooved cam mechanism and operatively connected with said spindles to reciprocate the same, suitable gearing engaging said spindles to revolve the same, a clutch mechanism for controlling the revolution of said spindles and means for automatically throwing said clutch mechanism into and out of action.

2. In apparatus of the character described, the combination with one or more revoluble spindles or twister-heads mounted in manner free to reciprocate, of mechanism for operating said spindles comprising a cam-shaft, cam mechanism upon said shaft, lever mechanism engaged by said cam mechanism and operatively connected with said spindles to reciprocate the same, suitable gearing engaging said spindles to revolve the same, a clutch mechanism for determining the extent of revolution of said spindles and an adjustable tripper-lever for throwing said clutch mechanism out of action and a suitable revoluble part engaging said tripper-lever to shift the same.

3. In apparatus of the character described, the combination with a main frame, of a drive-shaft extending lengthwise of said frame, a cam-shaft extending transversely of said frame and suitably geared to said drive-shaft, cam mechanism upon said cam-shaft, one or more revoluble and reciprocating spindles mounted upon the main frame, lever mechanism operatively connecting said cam mechanism and said spindles whereby said spindles are reciprocated and gear mechanism connecting the main drive-shaft with the spindles whereby revolution is imparted to said spindles.

4. In apparatus of the character described, the combination with a suitable main frame and with one or more revoluble and reciprocating spindles mounted on said frame, of a main drive-shaft, a cam-shaft extending at right angles to said shaft, cam-wheels fixed upon said cam-shaft, driving-levers engaging with said cam-wheels, the upper ends of said driving-levers being operatively connected with said spindles, suitable means for imparting revolution to said spindles and clutch mechanism for throwing said spindles into and out of action and automatic-actuated tripping mechanism for said clutch mechanism.

5. In apparatus of the character described, the combination with the main frame and with a drive-shaft mounted thereon, and with one or more revoluble and reciprocating spindles mounted on said frame, of a cam-shaft geared to said drive-shaft and provided with cam mechanism, and lever mechanism engaging said cam mechanism, said lever mechanism being adjustably connected with the spindles whereby the throw of said spindles may be varied.

6. In apparatus of the character described, a spindle or twister-head provided with a central aperture for one wire and with an eccentric aperture for another wire and with a groove or depression in the face of the spindle-head between said apertures.

7. In apparatus of the character described, the combination with one or more spindles or twister-heads, of means for feeding slats in front of said spindles or twister-heads comprising a feed device adapted to engage the end of a slat and means for shifting said feed device before it reaches the end of said slat to prevent its engagement with the end of said slat.

8. In apparatus of the character described, the combination with one or more spindles or twister-heads, of mechanism for feeding slats in front of said spindles or twister-heads comprising a feed-chain and means for driving the same, a dog mounted upon said feed-chain for engaging the ends of the slats and means for shifting the dog to prevent its engagement with the slats.

9. In apparatus of the character described, the combination with one or more spindles or twister-heads, of means for feeding slats in front of said spindles or twister-heads comprising a rack wherein the slats are held, a feed-chain extending beneath said rack, a feed-dog mounted upon said chain and having at its top a shoulder or part to engage the end of the lowermost slat, and a shiftable support for said feed-dog arranged beneath said rack and whereby said dog may be thrown out of action to prevent its engagement with the lowermost slat.

10. In apparatus of the character described, the combination with one or more spindles or twister-heads, of means for feeding slats in front of said spindles or twister-heads comprising a rack for the slats, a feed-chain extending beneath the bottom of said rack, a feed-dog carried by said chain and a table beneath said rack and over which said chain and dog travel, said table being shiftable to prevent the engagement of the dog with the lowermost slat.

11. In apparatus of the character described, the combination with one or more spindles or twister-heads, of a rack for the slats, means for feeding slats in front of said spindles or twister-heads comprising a feed-chain arranged to travel beneath the slats in said rack, a dog pivotally connected to said feed-chain and a table or support beneath said feed-chain and beneath said rack upon which table said dog rests as it passes beneath the rack, said table being shiftable to prevent the engagement of the dog with the slats.

12. In apparatus of the character described, the combination with one or more spindles or twister-heads, of means for feeding slats in front of said spindles or twister-heads comprising a rack for supporting the slats, a feed-chain arranged to travel beneath said rack and provided with a dog to engage the lowermost slat within said rack and an adjustable sprocket-wheel for said feed-chain.

13. In apparatus of the character described, the combination with one or more spindles or twister-heads, of means for feeding slats in front of said spindles or twister-heads comprising a rack for supporting the slats, a feed-chain provided with a dog whereby the slats are fed in front of the spindles, a table located beneath said rack and over which said feed-chain and dog pass, and means whereby said table may be manually shifted in order to prevent the engagement of the dog with the slats.

14. In apparatus of the character described, the combination with one or more spindles or twister-heads, of a feed device for automatically advancing the slats in front of the spindles or twister-heads, suitable means whereby the series of slats are advanced after they have been connected with the wires by said spindles, mechanism for shifting said feed device to prevent its engagement with the slats, and suitable tripper mechanism engaging with the woven fabric and arranged in position to pass through said fabric and in so doing to actuate the mechanism whereby the feed device is shifted.

15. In apparatus of the character described, the combination with one or more spindles or twister-heads and with mechanism for feeding slats in front of said spindles or twister-heads, of mechanism for advancing the woven fabric, mechanism for automatically throwing the slat-feeding mechanism out of action, and a suitable dummy or spacing mechanism arranged to pass in front of the spindles or twister-heads when the slat-feeding mechanism is thrown out of action and thereby form an opening in the fabric.

16. In apparatus of the character described, the combination of one or more spindles or twister-heads, mechanism for feeding slats in front of said spindles or twister-heads, mechanism for automatically throwing said feeding mechanism out of action and a dummy or spacing mechanism arranged to be moved in front of said spindles or twister-heads and between the wires issuing therefrom when the slat-feeding mechanism is thrown out of action in order to form open spaces in the fabric.

17. In apparatus of the character described, the combination with one or more spindles or twister-heads whereby wires are bound around slats to form a fabric, of a dummy or spacing mechanism and means for inserting and withdrawing said dummy or spacing mechanism into and from the fabric at the points where the slats have been omitted.

18. In apparatus of the character described, the combination with one or more spindles or twister-heads whereby wires are bound around slats to form a fabric, of a dummy or spacing mechanism movable in the direction of the length of the slats and at right angles thereto, means for inserting and withdrawing said dummy or spacing mechanism into and from the fabric at the points where the slats have been omitted, mechanism for automatically feeding the slats in front of the spindles or twister-heads, and means for throwing said slat-feeding mechanism out of operation when said dummy or spacing mechanism is to be thrown into action.

19. In apparatus of the character described, the combination with one or more spindles or twister-heads whereby wires are bound around slats to form a fabric, of a dummy or spacing mechanism, means for inserting and withdrawing said dummy or spacing mechanism into and from the fabric at points where slats have been omitted, said dummy or spacing mechanism comprising one or more pivoted arms having a part adapted to pass between the wires that issue from the spindles or twister-heads.

20. In apparatus of the character described, the combination with one or more spindles or twister-heads whereby wires are bound around the slats to form a fabric, of a dummy or spacing mechanism and means for inserting and withdrawing said dummy or spacing mechanism into and from the fabric at the points where slats have been omitted, said dummy or spacing mechanism comprising one or more pivoted arms mounted to swing in the direction of the length of the slats and in position to pass into the fabric at points where slats have been omitted.

21. In apparatus of the character described, the combination with one or more spindles or twister-heads whereby wires are bound around slats to form a fabric, of a dummy or spacing mechanism and means for inserting and withdrawing said dummy or spacing mechanism into and from the fabric at points where slats have been omitted, said dummy or spacing mechanism comprising pivoted arms or parts adapted to swing in the direction of the length of the slats and being mounted to move with the fabric transversely to the direction of the length of the slats.

22. In apparatus of the character described, the combination with one or more spindles or twister-heads whereby wires are bound around slats to form a fabric, of a dummy or spacing mechanism and means for inserting and withdrawing said dummy or spacing mechanism into and from the fabric at points where slats have been omitted, said dummy or spacing mechanism comprising pivoted arms or parts arranged beneath the spindles and pivoted at their upper ends with blades adapted to pass between the wires that issue from the spindles and being sustained in manner permitting movement in the direction of the length of the spindles.

23. In apparatus of the character described, the combination with suitable spindles or twister-heads whereby wires are bound around slats to form a fabric, of a dummy or spacing mechanism, means for inserting and withdrawing said dummy or spacing mechanism into and from the fabric at points where slats have been omitted, said dummy or spacing mechanism comprising two pivoted arms each furnished with a blade or head adapted to enter between the wires that issue from the adjacent spindle, and means whereby said arms may be simultaneously shifted.

24. In apparatus of the character described, the combination with suitable spindles or twister-heads whereby wires are bound around slats to form a fabric, of a dummy or spacing mechanism and means for inserting and withdrawing said dummy or spacing mechanism into and from the fabric at points where slats have been omitted, said dummy or spacing mechanism comprising pivoted arms arranged to swing transversely to the wires issuing from the spindles and being mounted in manner free to slide in the direction of said wires, suitable levers for operating said arms and means for engaging said levers whereby the arms may be simultaneously moved in front of the spindles.

25. In apparatus of the character described, the combination with one or more spindles or twister-heads whereby wires are bound around slats to form a fabric, of a dummy or spacing mechanism, means for inserting and withdrawing said dummy or spacing mechanism into and from the fabric at points where slats have been omitted, said dummy or spacing mechanism comprising one or more arms each having a part adapted to pass between the wires that issue from the spindles or twister-heads, suitable supports for said arms and whereon they are free to slide and means for retracting said arms toward the front of the machine after they have been withdrawn from the fabric.

26. In apparatus of the character described, the combination with one or more spindles or twister-heads whereby wires are bound around slats to form a fabric, of a dummy or spacing mechanism and means for moving said dummy or spacing mechanism between the slats of the fabric, comprising a tripper bearing against the fabric and adapted to pass into the open spaces thereof, said tripper being suitably engaged with the dummy or spacing mechanism whereby when one of the open spaces of said fabric comes opposite said tripper the dummy or spacing mechanism will be thrown into the fabric.

27. In apparatus of the character described, the combination with one or more spindles or twister-heads whereby wires are bound around slats to form a fabric, of a dummy or spacing mechanism and means for moving said dummy or spacing mechanism between the slats of the fabric, comprising a part engaging said dummy or spacing mechanism to shift the same and a part adapted to bear against the fabric and to enter the open spaces thereof, whereby when an open space of the fabric comes opposite the part of said shifting mechanism bearing against the fabric, the dummy or spacing mechanism will be thrown into action.

28. In apparatus of the character described, the combination with one or more spindles or twister-heads whereby wires are bound around slats to form a fabric, of a dummy or spacing mechanism and means for moving said dummy or spacing mechanism between the slats of the fabric, comprising a lever mechanism engaging said dummy or spacing mechanism, said lever mechanism being provided at one end with a part engaging the dummy or spacing mechanism and being provided at its opposite end with an upwardly-extending part adapted to bear against the under side of the fabric and to enter open spaces of said fabric whereby when an open space of the fabric comes opposite the part of said lever mechanism bearing against the fabric, the dummy or spacing mechanism will be thrown into action.

29. In apparatus of the character described, the combination with one or more spindles or twister-heads whereby wires are bound around slats to form a fabric, of a dummy or spacing mechanism comprising arms adapted to be moved in front of the spindles and mounted in manner free to slide back and forth in the direction of movement of the spindles, means for moving said dummy or spacing mechanism in front of the spindles and into the plane of the slats being woven and means for moving said dummy or spacing mechanism beneath the plane of the woven slats, and means for retracting the dummy to its initial position when it has been shifted entirely below the plane of the slats.

30. In apparatus of the character described, the combination with one or more spindles or twister-heads whereby wires are bound around slats to form a fabric, of a dummy or spacing mechanism for forming open spaces in the fabric, a table whereover the woven fabric is advanced, said table being formed with suitable openings, and means for moving said dummy or spacing mechanism to a position in front of the spindles, comprising lever mechanism, one part whereof engages the dummy or spacing mechanism and the opposite part whereof extends up through the slotted table into position to bear against the under side of the woven fabric whereby when an open space of said woven fabric passes above the rear end of said lever mechanism the dummy or spacing mechanism will be thrown into action.

31. In apparatus of the character described, the combination with one or more spindles or twister-heads whereby wires are bound around slats to form a fabric, of a shaft provided with cutter-heads arranged adjacent the ends of said spindles, and suitable means for forcing the slats beneath the cutter-heads before revolution is imparted to the spindles or twister-heads.

32. In apparatus of the character described, the combination with one or more spindles or twister-heads whereby wires are bound around slats to form a fabric, of a shaft provided with cutter-heads and push-rods mounted to move in unison with the spindles and arranged in close proximity to the cutter-heads.

GEO. P. FISHER, JR.
JOSEPH REIF, JR.

Witnesses:
FRED GERLACH,
ALBERTA ADAMICK.